United States Patent [19]
Georgiades et al.

[11] Patent Number: 5,404,516
[45] Date of Patent: Apr. 4, 1995

[54] SYSTEM FOR ALLOCATING RESOURCES AND METHOD

[75] Inventors: Diane E. Georgiades, Yorba Linda; Patrick R. Jensen, Riverside; Thomas S. Nichols, Fullerton, all of Calif.

[73] Assignee: Hughes Aircraft Company, Los Angeles, Calif.

[21] Appl. No.: 993,172

[22] Filed: Dec. 18, 1992

[51] Int. Cl.⁶ .............................................. G06F 13/00
[52] U.S. Cl. ............................. 395/650; 364/DIG. 1; 364/281.6
[58] Field of Search .................. 364/DIG. 1 MS File; 395/650, 725

[56] References Cited

U.S. PATENT DOCUMENTS

| | | | |
|---|---|---|---|
| 4,727,487 | 2/1988 | Masui et al. | 395/650 |
| 5,003,464 | 3/1991 | Ely et al. | 395/650 |
| 5,115,499 | 5/1992 | Stiffler et al. | 364/DIG. 1 |
| 5,307,496 | 4/1994 | Ichinose et al. | 395/650 |

OTHER PUBLICATIONS

"Multiple Objective Optimization with Vector Evaluated Genetic Algorithms", pp. 93-100, J. D. Schaffer, Department of Electrical Engineering, Vanderbilt University.

"Learning Multiclass Pattern Discrimination", pp. 74-79, J. D. Schaffer, Department of Electrical Engineering, Vanderbilt University.

Primary Examiner—Thomas M. Heckler
Attorney, Agent, or Firm—W. K. Denson-Low

[57] ABSTRACT

A system for allocating resources having a first mechanism for receiving a collection of input parameters and a second mechanism for processing data in accordance with the input parameters. The second mechanism includes a third mechanism for generating a collection of asset schedules, a fourth mechanism for providing a random set of combinations of asset schedules and a fifth mechanism for providing a set of asset allocation schedules. Finally, a sixth mechanism is provided for allocating resources in accordance with the set of asset allocation schedules. In a preferred embodiment, the system for allocating resources of the present invention receives and formats input data. Upon activation of a switch, the formatted data is loaded into and operated upon by a data processor. The data processor generates, stores, evaluates and prioritizes asset schedules. A reduced set of combinations of asset schedules is selected for reproduction to provide a random set of asset schedules after several iterations within a feedback loop. A selected combination of asset schedules and the effectiveness rating thereof is thereafter monitored on a display.

24 Claims, 2 Drawing Sheets

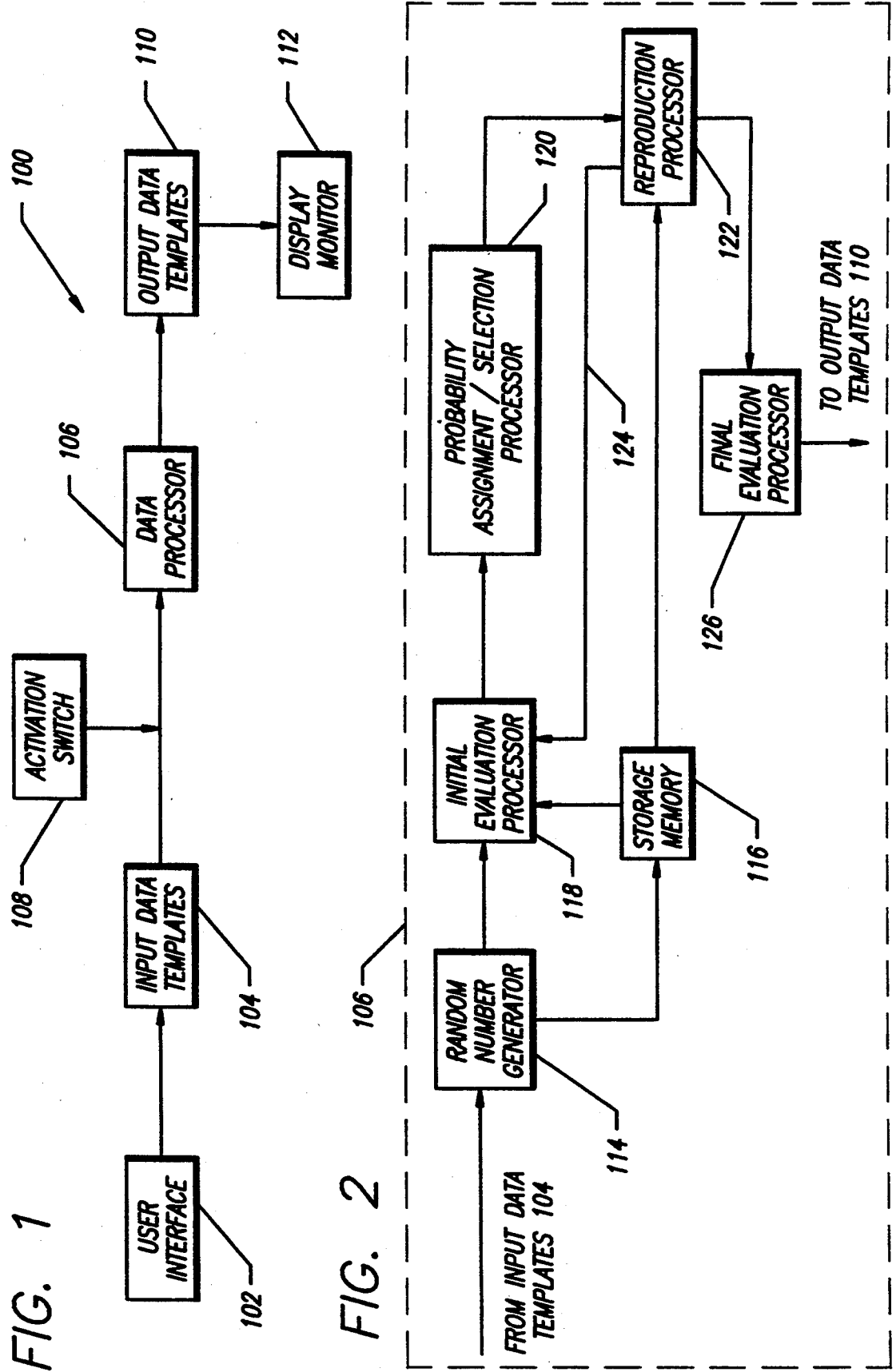

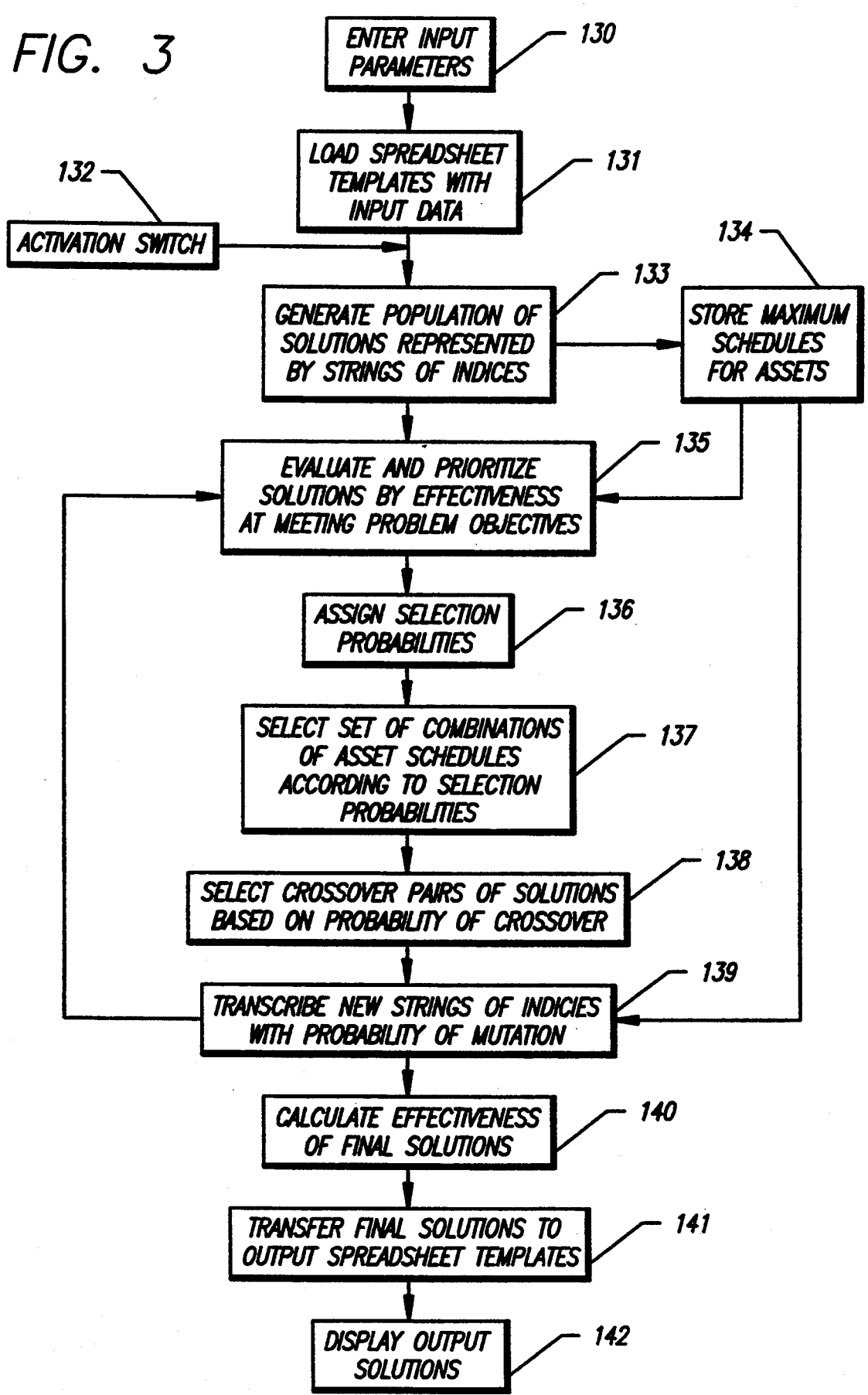

SYSTEM FOR ALLOCATING RESOURCES AND METHOD

BACKGROUND OF THE INVENTION

1. Field of the Invention

The present invention relates to systems and techniques for allocating and scheduling resources. More specifically, the present invention relates to methods and apparatus for the allocation and scheduling of resources in time critical (e.g., military) applications.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

2. Description of the Related Art

The optimum allocation and scheduling of material may be difficult and challenging in large scale commercial, industrial and military applications. A conventional resource allocation technique utilizes a supercomputer and an exhaustive search to examine all possible combinations of resources to arrive at the optimum allocation schedule. The technique is computation intensive and the time required for the completion of a single execution plan may be on the order of an entire month. Hence, the conventional method of resource management utilizing supercomputers is of limited utility in time critical situations.

Another method of resource management involves the use of a command, control, communications and intelligence ($C^3I$) workstation. The $C^3I$ workstation enables $C^3I$ planners to perform resource allocation and scheduling without analysis or validation, in the vicinity of the battlefield. The remote $C^3I$ workstation is a portable unit having computing power inferior to that of a conventional supercomputer. Unfortunately, the computer associated with the remote $C^3I$ workstation typically does not have sufficient computer computing power to perform the necessary computer simulations required to complete an execution plan.

Thus, there is a need in the art for a system for allocating and scheduling resources in time critical situations.

SUMMARY OF THE INVENTION

The need in the art is addressed by the resource allocation system of the present invention. The inventive system includes a first mechanism for receiving a collection of input parameters and a second mechanism for processing data in accordance with the input parameters. The second mechanism further includes a third mechanism for generating a collection of asset schedules, a fourth mechanism for providing a random set of combinations of asset schedules and a fifth mechanism for providing a set of asset allocation schedules. Finally, a sixth mechanism is provided for allocating resources in accordance with the set of asset allocation schedules.

In a preferred embodiment, the system for allocating resources of the present invention receives and formats input data. Upon activation of a switch, the formatted data is loaded into and operated upon by a data processor. The data processor generates, stores, evaluates and prioritizes asset schedules. A reduced set of combinations of asset schedules is selected for reproduction to provide a random set of asset schedules after several iterations within a feedback loop. A selected combination of asset schedules and the effectiveness rating thereof is thereafter monitored on a display.

BRIEF DESCRIPTION OF THE DRAWINGS

FIG. 1 is a simplified block diagram of an illustrative embodiment of the system for allocating resources of the present invention shown in a data processing environment.

FIG. 2 is a more detailed block diagram of the system for allocating resources of FIG. 1 showing the components of a data processor utilized to determine a set of asset allocation schedules.

FIG. 3 is a flow diagram of the system for allocating resources of FIG. 1 showing the processing steps executed to determine the set of asset allocation schedules.

DESCRIPTION OF THE INVENTION

The system for allocating resources 100 of the present invention is shown in FIG. 1. A user interface 102 is employed for receiving a plurality of input parameters into the system 100 from, for example, an operator. The user interface 102 can be any of several known data input devices such as a keyboard. The input parameters include data such as resources, priorities, constraints and the like that is specific to the problem that the system 100 is being utilized to address. The input parameters are entered, for example as by typing, into a plurality of input data templates 104 as shown in FIG. 1. The function of the input data templates 104 is to ensure that the input parameters are in the correct format for loading into a data processor 106. The data processor 106 utilizes the data of the input parameters to determine an optimum schedule for allocating a plurality of available resources or assets.

Located between the input data templates 104 and the data processor 106 is an activation switch 108 as shown in FIG. 1. The function of the activation switch 108 is to permit the data access to the data processor 106. Thus, when the activation switch 108 is operated, the input data, which represents the properly formatted input parameters, is transmitted to the data processor 106. The data processor 106 then operates on the input data provided by the input data templates 104. In general, the data processor 106 generates, stores, evaluates and prioritizes asset schedules. Thereafter, a reduced set of asset schedules is selected for reproduction to provide a random set of combinations of asset schedules after several iterations within the circuitry of the data processor 106.

A set of selected schedules for allocating the available assets or resources to a plurality of required tasks and the effectiveness rating thereof is provided by the data processor 106 to a plurality of output data templates 110. The output data templates 110 format the asset allocation schedules and the corresponding effectiveness rating for entry into a machine-human interface such as a display monitor 112. The asset allocation schedule can also be stored in a memory (not shown) for reference and control of the data processor 106 is then returned to the user interface 102. Thereafter, a different input data template 104 is utilized to transmit input data to the data processor 106 upon operation of the activation switch 108.

It is noted that several of the elements appearing in FIG. 1 can be implemented in computer software. In particular, the input data templates 104 and the output data templates 110 can be software controlled. The input data templates 104 and the output data templates 110 can each be commercial spreadsheet templates known in the art. The data is typed directly into the spreadsheet templates 104 via the user interface 102, e.g., the keyboard. Once the data is entered into the spreadsheet templates 104, the activation switch 108 is operated. The activation switch 108 can be, for example, a software button appearing on the screen of the display monitor 112. The activation switch or software button 108 can be triggered by a mouse associated with the display monitor 112.

The method associated with the system 100 is executed by utilizing a genetic algorithm in the data processor 106. The data processor 106 utilizes the genetic algorithm to generate, store, evaluate and prioritize the asset schedules. The genetic algorithm is a search and optimization technique that utilizes bit swapping among candidate solutions to leverage a search for a set of asset allocation schedules. Bit swapping is defined as a method of combining candidate solutions to form a new solution. Use of the inventive method does not require an exhaustive search of all possible solutions but instead utilizes a leveraged search. In a leveraged search, input parameters associated with a problem being addressed are entered into the input data templates 104 via the user interface 102. Entry of the input parameters into the system 100 allows the data processor 106 to avoid examining each and every possible schedule of assets. Thus, the number of computations and the search time required are reduced.

The reduced set of asset schedules is thereafter selected for reproduction. Reproduction of the reduced set provides a random set of combinations of asset schedules for selecting the schedule to allocate the available resources to the plurality of required tasks. Operation of the activation switch 108 accesses the code for the genetic algorithm. This action transfers control of the data processor 106 from the spreadsheet templates 104 to the genetic algorithm. After the genetic algorithm has evaluated the number of solutions indicated by the input parameters, the results are transferred to the output data templates 110. The operator can then access the evaluated solutions via the display monitor 112.

The genetic algorithm uses the input data entered into the input data templates 104 from the user interface 102 (e.g., keyboard) to search for a suitable combination of asset allocation schedules. The combination of asset allocation schedules is a solution to the problem addressed and defined by the input parameters entered into the template 104. Examples of input parameters include mission profiles, effectiveness matrices, asset allocations and genetic parameters. Genetic parameters consist of the probabilities of crossover and mutation, number of generations, population size and a random seed to search for the combination of asset allocation schedules. Additionally, the objectives of the problem addressed are also provided to the genetic algorithm. In the specific implementation of the present invention, a main objective is to allocate military material to a plurality of tasks in the most efficient manner.

The input data from the templates 104 enters the data processor 106 as shown in FIG. 2. Within the data processor 106, the input data is directed to a random number generator 114. The genetic algorithm utilizes the random seed input data parameter in the random number generator 114 to randomly generate a population of solutions or sets of combinations of asset schedules represented as strings of indices. An asset schedule is defined as a set of asset assignments that do not overlap in time. Each index is employed as a mechanism for allowing the genetic algorithm to manipulate the plurality of solution schedules. Further, each index references one of a set of maximal schedules for a particular asset. A maximal asset schedule is defined as a set of assignments to which no assignment can be added without causing an overlap in time. The size of the population of solutions or asset schedules is determined from the input parameters. The plurality of asset schedules, referred to as the maximum schedule for assets, are then stored in a data base storage memory 116 as shown in FIG. 2. The strings of indices identifying the plurality of asset schedules are then passed to an initial evaluation processor 118.

The initial evaluation processor 118 utilizes the effectiveness matrices of the input parameters to evaluate combinations of asset schedules in the population of solutions. Each combination of asset schedules is initially evaluated to determine the fitness of each set to be a solution. Each particular combination of asset schedules is evaluated against the problem objectives that were entered with the input parameters. This combination of asset schedules is represented by a string of indices. Each index within the string of indices is utilized as a pointer to retrieve an individual asset schedule from the set of maximum schedules for assets in the data base storage memory 116. Based upon the results of the evaluation, the combinations of asset schedules are ranked or prioritized according to the ability to satisfy the problem objectives. Those combinations or solutions that perform better at satisfying the problem objectives are ranked higher. The output signal transmitted from the initial evaluation processor 118 is a plurality of prioritized strings of indices.

The plurality of strings of prioritized indices are then transmitted from the initial evaluation processor 118 to a probability assignment and selection processor 120 as shown in FIG. 2. Based upon the priorities of the strings of indices, a probability of selection for each combination of asset schedules or strings of indices is determined. The combination of asset schedules that are prioritized the highest are assigned the highest probabilities of selection. The genetic algorithm then selects a reduced set of combinations of asset schedules or strings of indices using the assigned probabilities of selections. The reduced set is selected such that only a top percentage of the prioritized strings of indices are represented in the future population of combinations of asset schedules. As an example, if there are a total of one-hundred prioritized strings of indices, the top twenty-five strings can be selected. The top twenty-five strings of indices selected represents the top twenty-five combinations of asset schedules or solutions to the problem. The selected strings of indices are then transmitted to a reproduction processor 122 as shown in FIG. 2.

The reproduction processor 122 replicates the selected strings of indices to increase the number of strings of indices available for selection. This is accomplished in the operations known as crossover and mutation. The crossover operation consists of randomly selecting pairs of strings of indices of the combinations of asset schedules. Each of the pairs of strings of indices are then bisected at a randomly selected slice point creating four partial strings of indices. The four partial strings of indices are then exchanged to form two new strings of indices or combinations of asset schedules. It is noted that the original strings of indices of the selected pair of combinations of asset schedules are lost. The genetic algorithm performs the crossover operation on the set of best combinations of asset schedules based upon the probability of crossover which is included in the input parameters. The number of strings of indices is now equivalent to the number of prioritized strings of indices entering the probability assignment and selection processor 120. It is further noted that when an index string representing a combination of asset schedules having a high priority is paired with itself during the crossover operation, the high priority combination of asset schedules is propagated into the next generation of combinations of asset schedules or solutions.

As the two new strings of indices are transcribed during crossover, a transcription error process is applied to each index in each string of indices. In this process, a mutation probability parameter determines whether the index is altered on transcription. If the index is altered, a new schedule is selected from the maximum schedules of assets for the corresponding asset. This is in accordance with the definition of mutation which is the random swapping of indices according to the probability of mutation. Further, the index of the new schedule is substituted for the original index in the appropriate string of indices. These steps are accomplished by connecting the reproduction processor 122 to the storage memory 116 as is shown in FIG. 2.

Upon completion of the crossover and mutation operations, the reproduction processor 122 has defined a new generation of combinations of asset schedules. The genetic algorithm will continue to evaluate, prioritize and select strings of indices and to perform reproduction of the strings of indices via crossover and mutation for several iterations. Each iteration defines a new generation of strings of indices or combinations of asset schedules and the number of generations is specified as an input parameter entered by the operator. This is accomplished via a feedback loop 124 as shown in FIG. 2. The feedback loop 124 includes the initial evaluation processor 118, the probability assignment and selection processor 120 and the reproduction processor 122. Each new generation of strings of indices is feedback from the reproduction processor 122 to the initial evaluation processor 118 and is transmitted through the loop 124 for the specified number of iterations. The set of combinations of asset schedules, represented by the set of strings of indices of the most recent generation, is then transmitted to a final evaluation processor 126 as shown in FIG. 2.

The final evaluation processor 126 receives the set of strings of indices of the selected combinations of asset schedules from the reproduction processor 122. The final evaluation processor 126 serves to determine the fitness of the selected set of combinations of asset schedules to be solutions. As with the initial evaluation processor 118, the final evaluation processor 126 utilizes the problem objectives to evaluate the fitness of each of the selected combinations of asset schedules. The selected combinations of asset schedules can be, for example, a plurality of high priority asset schedules. Each of the high priority asset schedules reasonably satisfy the problem objectives. In the implementation described in the present invention, a major problem objective is the efficient allocation of resources such as military material. The selected combination of asset schedules might include ten asset schedules that reasonably meet these specific problem objectives. The plurality of high priority asset schedules ensures that a solution exists if the highest priority asset schedules are not feasible to the $C^3I$ planner. The selected combination of asset schedules and the effectiveness rating thereof are transmitted to the output data templates 110 and displayed on the monitor 112 as shown in FIG. 1. The selected combination of asset schedules is thereafter utilized for allocating resources.

The operating steps of the system for allocating resources 100 is shown in FIG. 3. Initially, the input parameters are entered into the user interface 102 as shown in step 130. The input parameters or data are loaded into the input spreadsheet templates 104 as shown in step 131. Thereafter, the activation switch 108 is operated as shown in step 132 to transfer the data loaded into the input spreadsheet templates 104 to the data processor 106. Then, the population of asset schedules or solutions represented by strings of indices is generated as shown in step 133 and stored in the memory 116 of maximum schedules for assets as shown in step 134. Thereafter, the population of combinations of asset schedules, via the strings of indices, is evaluated for effectiveness to meet the problem objectives in the initial evaluation processor 118 as shown in step 135.

Next, the assignment of the selection probabilities to the strings of indices by the probability assignment and selection processor 120 is shown in step 136. The selection of the reduced set of combinations of asset schedules according to the selection probabilities is shown in step 137. The crossover pairs of solutions based upon the probability of crossover within the reproduction processor 122 are selected as shown in step 138. Then, the new strings of indices are transcribed based upon the probability of mutation as shown in step 139. Thereafter, the plurality of steps 135, 136, 137, 138 and 139 are repeated for a specified number of iterations to provide a generation of random strings of indices representing the reduced combination of asset schedules. The effectiveness of each of the selected combinations of asset schedules or final solutions is determined in the final evaluation processor 126 as shown in step 140. The selected combinations of asset schedules or final solutions are then transferred to the output spreadsheet templates 110 as shown in step 141. Finally, the selected combination of asset schedules or final solutions are displayed on monitor 112 as shown in step 142.

The method of the present invention disclosed in FIG. 3 is implemented in the data processor 106. Use of this method permits planners to address extremely demanding optimization problems. An example is that of allocating military resources, such as material, using a desktop computer which exhibits a computing performance inferior to that of the supercomputer used for the same purpose in the past. An application of the inventive system 100 is in the command, control, communications and intelligence ($C^3I$) workstation. The $C^3I$ workstation is a data processing system used, for example, in developing and planning military strategy on a daily basis. A $C^3I$ workstation receives a plurality of input parameters related to resources, personnel, verbal orders and intelligence data from the battlefield. Implementation of the present invention in the $C^3I$ workstation adds analysis capabilities thereto and enables $C^3I$ planners to utilize the system for allocating resources in the field during time critical situations to arrive at acceptable solutions to realistic problems.

An example application of the system for allocating resources 100 is as follows. Suppose a set of threats having certain locations and capabilities are known. The threats may include surface-to-air missile (SAM) sites and airborne interceptors. Other hostile assets such as airbases may be included as targets of offensive counter air missions. A set of offensive counter air missions designed to accomplish specific tasks is available. Each mission has a predetermined weapon loading, an allotment of weapons to each threat, and a predetermined (e.g., expected) time of engagement. The probabilities of kill of weapons against threats are also given.

A set of command, control and communication countermeasure (C3CM) resources (e.g., jammers) are allocated to support the missions. The resources can include communication jammers and radar jammers on stand-off aircraft. A communication jammer aircraft has a preassigned set of jammers. Some of the jammers carried by the radar jammer aircraft are computed in the solution of the problem. Capabilities of the resources against specific threats and mission targets are specified in terms of probabilities. The probability of kill of each threat type against an aircraft in a mission is also provided. The threat degradation achieved by a single jammer against each threat type is also given. The system for allocating resources 100 is applied to determine the allocation of radar and communication jammer resources to threats over time which will maximize mission effectiveness.

Each mission crosses a border into enemy territory to achieve a specific mission objective, for example, destroying runways on an airbase or suppressing enemy air defenses (e.g., destroying SAM sites). The mission must survive threats including airborne interceptors and several different types of SAM sites to succeed in the mission and on the subsequent return to a friendly base. Countermeasures consist of a plurality of noise jammers employed against radars to prevent detection of the missions. The jammers are also applied against communication systems to prevent attack warning and aircraft track from being relayed to weapons systems. Jammers are carried by stand-off jammer platforms. Jamming is only effective against a specific threat and not against any nearby threats. Each stand-off jammer platform is assigned a station and from a given station, the jammers on the platform can reach a subset of threats.

It is assumed that stand-off jammer platforms are able to locate and identify radars and communication links serving a particular threat. This is necessary if a stand-off jammer is to jam a particular radar or link rather than jam over a broad band against an entire class of threats. This requires that the platform correlate signal location, frequency and modulation with a known threat position. To be effective against a threat, a jammer must jam that threat throughout a time window during which a mission encounters the threat. The length of the time window is assumed to be ten minutes to account for uncertainty regarding the time of encounter. A table of jammer degradation factors against threats is assumed to be given by an off-line tool. The degradation factors are chosen somewhat arbitrarily within the bounds of common sense.

Multiple jammers simultaneously encountering a specific threat will display diminishing returns in effectiveness For example, if jammers of types "a", "b" and "c" are assigned to jam a single threat of type "j" having effectiveness probabilities $$Pe_{aj} \geq Pe_{bj} \geq Pe_{cj} \qquad [1]$$

then the threat effectiveness would be multiplied by the factor of $$(1-Pe_{aj})(1-Pe_{bj}/2)(1-Pe_{cj}/3). \qquad [2]$$

The number of threats and aircraft surviving each engagement are expressed as expected values rather than as probability distributions. The expected values will be used in determining the outcomes of subsequent engagements. This simplification enables a much easier determination of the objective function and is suitable for this initial stage of the algorithm development. A rigorous objective function can be subsequently developed. It is further assumed that in engagements between red and blue aircraft, the blue aircraft have the first engagement opportunity. In engagements between SAM sites or regiments and blue aircraft, the SAM sites have the first engagement opportunity.

The input parameters to the user interface 102 define the scenario. The input parameters include: the missions, the mission sizes, the mission. weapons and the number of weapons assigned to each threat; the threats encountered, the number of threats and their effectiveness against blue aircraft; the effectiveness of weapons and command, control and communication countermeasure (C3CM) resources against the threats; and the set of missions affected by each stand-off radar or communication jammer. The following arrays of data are input for a mission "S". The data for a mission "i" is input as a sequence of events $E_i$ where $$E_i = (t_i, R_i, W_i, N_1) \qquad [3]$$

and $t_i$ is the time at which the aircraft and the threat exchange fire, or at which the aircraft delivers weapons on a target, $R_i$ is the type and identification of the threat or target encountered, $W_i$ is the type of weapons used against the threat or target, and $N_i$ is the number of weapons used against the threat or target.

For each threat or target "R", the following input parameter data is entered into user interface 102. $N_R$ is the number of threat or target elements (e.g., SAM sites or airborne interceptors associated with a single threat), and $T_R$ is the type and identification of a threat or target (e.g., regiment, battery or aircraft flight). Each jammer platform "J" of the C3CM resources requires the input $L_J$ which is the set of missions supported by the stand-off jammer.

Degradation matrices $[Pe_{ij}]$ specify the effect of a weapon on a threat and of a threat on a mission. The indices "i" and "j" represent the attacker and the attacked entities, respectively. Each matrix entry $Pe_{ij}$ is the degradation of the attacked entity by the attacking entity. If a mission uses weapons of type "i" to attack a SAM regiment of type "j", then $Pe_{ij}$ is a single shot probability of kill against one battery of the SAM regiment. If a SAM battery of type 5 attacks a mission of type 1, then $Pe_{51}$ represents the single shot probability of kill of the SAM battery against a single aircraft. It is assumed that all missions are of the same type and that all missions are composed of the same aircraft. A degradation matrix $[Pc_{kj}]$ specifies the effect of C3CM resource types "k" on threat types "j". For example, if a jammer of type 3 is employed against a SAM battery of type 6 and $Pc_{36}=0.2$, then the effectiveness of the SAM battery is degraded by 20%, e.g., it is 20% less effective.

To preserve resource schedule building blocks, the assignments of a single jammer are grouped together. Maximal schedules (those to which no assignments can be added without creating a time conflict) are constructed initially. This approach has the advantage of ensuring that each jammer is used to the fullest extent possible in each trial asset schedule or solution. The resulting representation contains an ordered sequence of resource schedules with each schedule being represented by an integer index to a list of maximal schedules stored in memory 116. The representation is $$(V_1, V_2, V_3, V_4, \ldots, V_n) \quad [4]$$

where $V_i$ is the schedule for resource "i", a time ordered sequence of assignments of jammer "i" to threats or targets. The set of maximal schedules for a resource is easy to create using the following recursive algorithm comprised of three procedures. Let "a" be an assignment of a jammer and define the following functions of "a":

t(a) = the threat or target to which the jammer is assigned,
m(a) = the mission supported by the assignment,
s(a) = the start time of the assignment, and
e(a) = the end time of the assignment.

Let "A" be the set of all possible assignments "a" of the jammer.

The first of the three procedures is initialization. Let "a" be the first assignment in "A" (e.g., choose "a" such that for all "c" in "A", $s(a) \leq s(c)$) Let u=s(a). Let "V" be the empty schedule and create Branches (a, u, V). The second of the three procedures is to create Branches (a, u, V). Let "B" be the set of all assignments "b" in "A" such that $u \leq s(b) < e(a)$ and $s(b) \geq u$. This set includes "a". For each assignment "b" in set "B", Process Branch (b, V) and return. The third of the three procedures is to process Branch (b, V). Create a new schedule V' by appending assignment "b" to "V". Let u=e(b) and let "a" be the first assignment in "A" for which $s(a) \geq u$ {e.g., choose "a" such that $s(a) \geq u$ and for all "c" in "A" $s(a) \leq s(c)$}. If "a" does not exist, save the completed schedule "V'", otherwise, create Branches (a, u, V') and return.

A basic equation is used for the expected number of survivors in an engagement between attackers of type "i" and targets of type "j". The equation is $$E_{ij} = m_j - (Pe_{ij})(b_i) \quad [5]$$

where $Pe_{ij}$ is the probability that an attacker using a weapon of type "i" is effective against a target of type "j", $m_j$ is the expected number of targets of type "j" under attack, $b_i$ is the number of weapons of type "i" used in the attack and $b_i \leq m_j$. Attackers can be blue or red aircraft or red SAM sites. The targets can be red or blue aircraft, red SAM sites or other red targets. If more than $m_j$ weapons are launched at once, then equation [5] is applied iteratively enough times to account for the number of weapons launched. At each iteration, $m_i$ is the number of survivors $E_{ij}$ from the previous iteration and $b_i = m_i$ except possibly on the last iteration.

The probabilities $Pe_{ij}$ are given in tabular form for red attackers versus blue targets and also for blue attackers versus red targets. The probabilities for the effectiveness of red attackers versus blue targets are modified by the effectiveness of the countermeasures according to $$Pe'_{ij} = Pe_{ij} \prod_{k=1}^{k_{i,j}} (1 - Pc_{kj}/k) \quad [6]$$

where $K_{ij}$ is the number of countermeasures applied against threat "j" in support of an attacker of type "i", and "k" indexes the set of countermeasures applied against threat "j" in support of an attacker of type "i". The set of countermeasures is ordered such that $$Pc_{kj} \geq Pc_{k+1,j} \quad [7]$$

for k=1 to $K_{ij}-1$, and $Pc_{kj}$ is the probability that a countermeasure of type "k" is effective against a target of type "j".

The objective of the system for allocating resources 100 is to maximize the probability of accomplishment for each of a given set of prioritized blue offensive counter air missions. A higher priority mission is to receive resources in preference to a lower priority mission until the higher priority mission achieves a probability of effectiveness of 0.9. The rate of blue aircraft loss over all missions is not to exceed 2% of the total aircraft used. The value of the objective for a given resource allocation is determined by a time-stepped simulation model. The expected number of aircraft remaining in each mission and the expected number of surviving threats must be updated in chronological sequence since the outcome of an engagement depends on the number of attackers and targets entering the engagement.

To determine the objective value of an assignment of countermeasures to threats in support of missions, it is necessary to evaluate the number of surviving threats against mission objectives. The probability of mission accomplishment for each mission is the expected number of threats killed by the mission divided by the expected number of threats targeted by each mission. The aircraft survival rate is also determined which is the number of aircraft surviving in each mission divided by the number of aircraft used in each mission. The simulation processes the events chronologically at a one minute resolution. The simulation updates the status of any mission or threat affected at each time step. The status of a mission is the number of aircraft remaining and the number of weapons of each type remaining. It is noted that the number of weapons surviving is reduced in proportion to the number of aircraft killed in the mission. The status of a threat is the number of threats surviving and the possibly degraded effectiveness of the surviving threats. The degradation caused by any jammers targeting a threat is applied in determining threat effectiveness against blue aircraft.

Selecting an event from a mission timeline may result in weapon delivery against the threat. A mission timeline is specified as follows:

$$(E_1, E_2, E_3, \ldots, E_n) \quad [8]$$

where $E_i$ is the "ith" event in the timeline as previously defined. If the threat encountered consists of red aircraft, the blue aircraft have the first opportunity to fire. If the threat encountered consists of a SAM site or regiment, the SAM site has the first opportunity to fire.

A multiobjective fitness or evaluation function is utilized to find an optimal solution. The effectiveness of each mission can fall within the range of (0.0–0.9) which represents the fraction of assigned threats killed. Any achieved effectiveness value larger than 0.9 is truncated to 0.9. This prevents a mission from being allocated more jammer resources than is necessary to meet the effectiveness goal. The multiobjective fitness or evaluation function seeks to simultaneously optimize the effectiveness of each of the missions. Because missions may compete with one another for jammer resources, high effectiveness on one mission may be achieved at the expense of lower effectiveness on another mission. The multiobjective approach is known in the art and can be reviewed in the work entitled *Multiple Objective Optimization with Vector Evaluated Genetic Algorithms* by J. D. Schaffer published in the Proceedings of an International Conference on Genetic Algorithms and Their Applications, 1985, pp. 93–100.

The multiobjective approach as developed by Schaffer tends to provide Pareto optimal solutions. A Pareto optimal solution "y" is one which is not dominated by any other solution "x" in the sense that "y" is more effective than every "x" on some mission or equal to "x" on all missions. In Schaffer's method, each objective is used to select some members of the population for reproduction in the reproduction processor 122. Crossover is applied to the pool of selected members.

After a number of generations is produced in the random number generator 114, the entire population of solutions or strings of indices are evaluated against all objectives in the initial evaluation processor 118. The strings of indices or asset schedules which maximize the objective for the highest priority mission are selected. In the case of two or more asset schedules or solutions tied at a mission effectiveness probability of 0.9 or less, the tie is broken by the next mission in priority order. The tie-breaking process continues down the mission priority list until a single mission is selected or until the end of a list is reached. In this situation, an asset schedule or solution is selected arbitrarily from the tied solutions. The aircraft loss rate for the particular jammer allocation is also computed.

Each objective function is utilized to select a number of asset schedule members from the population which is inversely proportional to the number of objectives. If the size of the asset schedule population is "P" and the number of objectives is "n", then the number selected by each objective is "P/n". Note that "P" can be arbitrarily chosen to be an integer multiple of "n". This can be accomplished as follows. First, for each objective, rank the asset schedule population in order of decreasing objective value. Then, assign a rank of "r"=1 to the asset schedule member of the population with the highest value and a rank "r"="P" to the asset schedule member of the-population having the lowest value. Second, assign a probability of selection Ps to each asset schedule member of the population of solutions equal to $2(P-r)/(P^2-P)$. Third, randomly select P/n asset schedule members of the population according to these probabilities of selection. The asset schedule members of the population selected in this manner are entered into a pool from which random pairs are selected for the crossover operation.

The crossover operation is performed in the following manner. First, a pair of asset schedule members from the pool of selected members are randomly selected. Second, the crossover operation is performed on the randomly selected pair of asset schedule members with a probability of Pc. This is accomplished by cutting the string of indices of each selected pair in the same randomly chosen location. Then, the pieces of the randomly selected pair are rearranged to form two new strings of indices with each new string receiving one piece from each of the original selected pair. Thereafter, each asset schedule element of each new string of indices is mutated with the probability Pm. Because each element of each string of indices corresponds to an asset schedule for a specific resource, mutation consists of randomly choosing a schedule from the maximum schedules for assets in storage memory 116 for that particular resource.

Thus, the present invention has been described herein with reference to a particular embodiment for particular application. Those having ordinary skill in the art and access to the present teachings will recognize additional modifications, applications and embodiments within the scope thereof. Although the detailed description is directed to a system for allocating military material, the present invention is equally applicable to commercial applications such as the allocation of resources in the airline, freight and automotive industries.

It is therefore intended by the appended claims to cover any and all such modifications, applications and embodiments within the scope of the present invention.

Accordingly,

What is claimed is:

1. A system for the allocation of resources comprising:
   first means of receiving a collection of input data parameters;
   second means for processing said input data parameters, said second means including:
      third means responsive to said input data parameters for generating a collection of asset schedules,
      fourth means responsive to said collection of asset schedules for providing a random set of combinations of asset schedules, and
      fifth means responsive to said random set of asset schedules for providing a set of asset allocation schedules; and
   sixth means for indicating an allocation of resources in accordance with said set of asset allocation schedules.

2. The system of claim 1 wherein said first means comprises a keyboard.

3. The system of claim 1 wherein said first means comprises a plurality of input data templates.

4. The system of claim 1 wherein said second means comprises a data processor.

5. The system of claim 4 further including an activation switch for initiating the operation of said data processor.

6. The system of claim 1 wherein said third means comprises a random number generator.

7. The system of claim 1 wherein each said asset schedule is represented as a string of indices, and said fourth means further comprises a reproduction processor which includes means for randomly selecting pairs of strings of indices of said combinations of asset schedules, and means for creating at least one new string of indices from each randomly selected pair.

8. The system of claim 1 wherein said fifth means comprised a final evaluation processor.

9. The system of claim 1 further including a storage memory for storing said generated collection of asset schedules.

10. The system of claim 1 wherein one or more of said input data parameters specifies objectives of the addressed problem, said system further including an initial evaluation processor for evaluating said generated collection of asset schedules for fitness of each said combination of asset schedules to be a solution to said addressed problem.

11. The system of claim 1 further including a probability assignment and selection processor for assigning probabilities and selecting said asset schedules.

12. The system of claim 1 wherein said sixth means comprises a plurality of output data templates.

13. The system of claim 1 wherein said sixth means comprises a display monitor.

14. A method for the allocation of resources, said method comprising the steps of:
   receiving a collection of input data parameters, wherein one or more of said input parameters defines a problem addressed by said method;
   processing said input data parameters, said data processing including the steps of:
   generating a collection of asset schedules from said data in dependence on said input data parameters,
   selecting a reduced set of combinations of asset schedules from said collection of asset schedules,
   reproducing said selected combinations of asset schedules to provide a random set of combinations of asset schedules,
   evaluating said random set of combinations of asset schedules as solutions to said addressed problem to provide a set of asset allocation schedules; and
   indicating an allocation of resources in accordance with said set of asset allocation schedules.

15. The method of claim 14 further including the step of representing each asset schedule of said collection of asset schedules by an index to retrieve said asset schedules from a memory.

16. The method of claim 14 further including the step of prioritizing each asset schedule of said collection of asset schedules.

17. The method of claim 14 wherein said indicating step includes displaying said set of asset allocation schedules.

18. The method of claim 14 further including the step of operating a switch for initiating said step of processing said input parameters.

19. The method of claim 14 further including the step of performing iterations on said reduced set of combinations of asset schedules to converge to said set of asset allocation schedules.

20. The method of claim 14 further including the step of transmitting said set of asset allocation schedules to a plurality of output data templates.

21. The method of claim 14 further including the step of assigning a selection probability to each of said asset schedules in said collection of asset schedules.

22. The method of claim 14 wherein said step of reproducing said selected asset schedules includes the step of crossing over a pair of asset schedules from said reduced set of combinations of asset schedules to form a new pair of asset schedules.

23. The method of claim 14 wherein said step of reproducing said selected asset schedules includes the step of mutating a selected asset schedule from said reduced set of combinations of asset schedules with an asset schedule from a memory for providing said random set of combinations of asset schedules.

24. The method of claim 14 further including the step of storing said generated collection of asset schedules in a memory.

* * * * *